United States Patent Office 3,732,304
Patented May 8, 1973

3,732,304
NOVEL COMPOSITION
John D. Diekman, Menlo Park, and John B. Siddall, Palo Alto, Calif., assignors to Zoecon Corporation, Palo Alto, Calif.
No Drawing. Filed May 10, 1971, Ser. No. 142,076
Int. Cl. C07c 87/02
U.S. Cl. 260—563 R         11 Claims

ABSTRACT OF THE DISCLOSURE

Novel amino cyclopentane compounds of Formula A, prepared from a cyclopentane-1,3-dione, useful for the control of insects

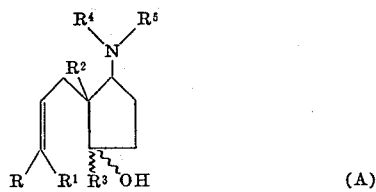

wherein each of R, $R^1$, $R^3$, $R^4$, and $R^5$ is hydrogen or lower alkyl, R and $R^1$ together form a cycloalkyl ring, and $R^2$ is methyl or ethyl.

---

This invention relates to novel compounds and the preparation and use of the compounds. More particularly, the novel compounds of the present invention are represented by the following Formula A:

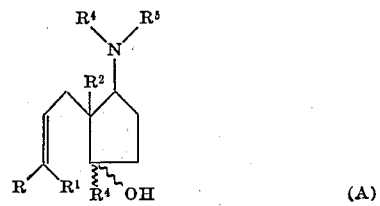

wherein, each of R, $R^1$, $R^3$, $R^4$ and $R^5$ is hydrogen or lower alkyl, R and $R^1$ together form a cycloalkyl ring, and $R^2$ is methyl or ethyl.

The term "lower alkyl," as used herein, refers to a primary or secondary alkyl group having a chain length of one to six carbon atoms.

The compounds of the present invention are prepared according to the following outlined syntheses.

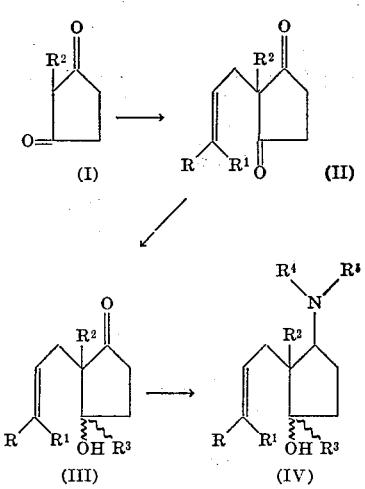

In the practice of the above outlined syntheses, 2-methyl or 2-ethylcyclopentane-1,3-dione is reacted with an allylic alcohol of the Formula IA in the presence of an acidic catalyst to form the 2,2-disubstituted cyclopentane-1,3-dione of Formula II

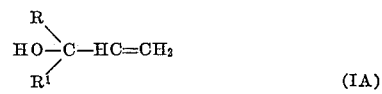

This reaction is performed neat or in an organic solvent inert to the reaction such as a hydrocarbon solvent under anhydrous conditions, and at a temperature above room temperature such as about 75° C. to 150° C. The reaction of a diketone of Formula II with a reducing agent such as lithium aluminum tri-t-butoxy hydride, lithium aluminum tri-methoxy hydride and the like in organic solvent inert to the reaction such as an ether solvent affords a compound of Formula III wherein $R^3$ is hydrogen as a mixture of the alpha and beta hydroxy compounds. To form a compound of Formula III wherein $R^3$ is lower alkyl, a diketone of Formula II is reacted with a Grignard $R^3$ MgX wherein X is bromo or chloro or a alkyl lithium of the formula $R^3$Li. The product is obtained as a mixture of isomers which can be separated by chromatography or distillation if desired. A ketol of Formula III is converted into a secondary or tertiary amino compound of Formula IV by reaction of the ketol with the appropriate primary or secondary amine in the presence of sodium cyanoborohydried in absolute methanol buffered to about pH 5. Primary amines of Formula IV are prepared by the reaction of the ketol compound III with ammonia in absolute methanol in the presence of lithium cyanohydridoborate. This method can be used also for preparation of secondary and tertiary amines of Formula IV. Borch and Durst, J. Am. Chem. Soc. 91, 3996 (1969).

The compounds of Formula A are useful for the control of insects. Without any intention of being bound by theory, it is believed that the effectiveness of these compounds is attributable to their capability of inhibiting moulting hormone biosynthesis and thereby prevent development of immature insects and prevent essential processes in adults which require moulting hormone for normal development. Delivery of the compounds into the active site within the insect can be accomplished by topical application or by ingestion, treatment of the insects food. Generally, a dosage within the range of about one to twenty-five micrograms per insect is used. Typical insects include Lepidoptera, Diptera, Coleoptera and Orthoptera. The compounds of Formula A are useful as anti-bacterial and anti-fungal agents also such as members of Carynebacterium, Erwinia, Xanthomonas, Pseudomonas, Agrobacterium, Rhizobium, Fusarium and Alternaria. The compounds of Formula A are useful also as hardening agents and accelerators for the hardening of liquid epoxy resins for casting.

The wavy line ($\{$) in the formulas herein indicates alpha and beta isomerism.

The following examples are provided to illustrate the present invention.

EXAMPLE 1

A mixture of 11.2 g. of 2-methylcyclopentane-1,3-dione, 29 g. of allyl alcohol, 100 mg. of para-toluene sulfonic acid and about 2 g. of anhydrous calcium sulfate in a glass bomb is heated in an oil bath at 130° for about 15 hours. The mixture is then poured into water and thoroughly extracted with ether. The ether phase is washed with water and brine, dried over calcium sulfate and concentrated.

The concentrate is distilled to yield 2-allyl-2-methylcyclopentane-1,3-dione. (cf. Crispin et al., J. Chem. Soc. C, 1970, 10).

EXAMPLE 2

To a mixture of 1.52 g. of 2-allyl-2-methylcyclopentane-1,3-dione and 80 ml. of dry tetrahydrofuran, under nitrogen and at 0°, is added 2.79 g. of lithium aluminum tri-t-butoxy hydride in 100 ml. of tetrahydrofuran slowly. The reaction mixture is stirred at 25° for 16 hours. Then 140 ml. of saturated sodium sulfate is added and the mixture filtered into a separatory funnel. The residue salts are washed with ether. The filtrate is then washed with brine, dried over calcium sulfate and evaporated to give 3-hydroxy-2-allyl-2-methylcyclopentan-1-one, as a mixture of 3α and 3β-hydroxy, which is purified by distillation.

EXAMPLE 3

A mixture of 5.1 g. of 2-methylcyclopentane-1,3-dione, 17.2 g. of 3-methylbut-1-en-3-ol, a trace of p-toluenesulfonic acid and small amount of calcium sulfate in a sealed tube is heated 2.5 hours at 130°. The mixture is dissolved in ether, washed with cold 2 N sodium hydroxide, water and brine, dried over calcium sulfate and solvent removed to yield crude 2-(3'-methylbut-2'-enyl)-2-methylcyclopentane-1,3-dione which can be purified by fractional distillation.

EXAMPLE 4

To a mixture of 2.7 g. of 2-(3'-methylbut-2'-enyl)-2-methylcyclopentane-1,3-dione in 80 ml. of dry tetrahydrofuran, under nitrogen and at 0°, is added 4.2 g. of lithium aluminum tri-t-butoxy hydride in 100 ml. of dry tetrahydrofuran. The reaction mixture is stirred at 25° for 18 hours and then 140 ml. of saturated sodium sulfate is added. The mixture is filtered directly into a separatory funnel and residue salts washed with ether. The ether phase is washed with brine, dried over calcium sulfate and evaporated to give 3-hydroxy-2-(3'-methylbut-2'-enyl)-2-methylcyclopentan-1-one (predominantly 3α-hydroxy) which can be purified by fractional distillation.

EXAMPLE 5

To a mixture of 756 mg. of isohexylamine, 30 ml. of anhydrous methanol, and 283 mg. of sodium cyanoborohydride, under nitrogen, adjusted to pH 5 by addition of dry hydrogen chloride, is added 231 mg. of 3-hydroxy-2-allyl-2-methylcyclopentan-1-one. After about 48 hours, the mixture is poured into cold 5% sodium bicarbonate solution and then extracted with ether. The ethereal extract is washed, dried and evaporated under reduced pressure to yield 3-hydroxy-2-allyl-2-methyl-1-(N-isohexylamino) cyclopentane.

By repeating the process of this example with the exception of using 3-hydroxy-2-(3'-methylbut-2'-enyl)-2-methylcyclo-1-one as the ketone starting material, there is produced 3-hydroxy-2-(3'-methylbut-2'-enyl)-2-methyl-1-(N-isohexylamino) cyclopentane.

EXAMPLE 6

Following the procedure of Example 1, each of n-but-1-en-3-ol, n-pent-1-en-3-ol, 3-methylpent-1-en-3-ol and 3-ethylpent-1-en-3-ol is reacted with 2-methylcyclopentane-1,3-dione to prepare 2-(n-but-2'-enyl)-2-methylcyclopentan-1,3-dione, 2-(n-pent-2'-enyl)-2-methylcyclopentan-1,3-dione, 2-(3'-methylpent-2'-enyl)-2-methylcyclopentan-1,3-dione and 2-(3'-ethylpent-2'-enyl)-2-methylcyclopentan-1,3-dione, respectively. Each of the thus-prepared diketo compounds is reduced following the procedure of Example 2 to prepare the respective 3-hydroxy compound, i.e., 3-hydroxy-2-(n-but-2'-enyl)-2-methylcyclopentan-1-one,
3-hydroxy-2-(n-pent-2'-enyl)-2-methylcyclopentan-1-one,
3-hydroxy-2-(3'-methylpent-2'-enyl)-2-methylcyclopentan-1-one, and
3-hydroxy-2-(3'-ethylpent-2'-enyl)-2-methylcyclopentan-1-one, respectively.

Following the procedure of Example 5, each of the thus-prepared 3-hydroxy-1-keto compounds is reacted with isohexylamine to produce the respective amino compound, i.e., 1-(N-isohexylamino)-3-hydroxy-2-(n-but-2'-enyl)-2-(n-but-2'-enyl)-2-methylcyclopentane,
1-(N-isohexylamino)-3-hydroxy-2-(n-pent-2'-enyl)-2-methylcyclopentane,
1-(N-isohexylamino)-3-hydroxy-2-(3'-methylpent-2'-enyl)-2-methylcyclopentane and
1-(N-isohexylamino)-3-hydroxy-2-(3'-ethylpent-2'-enyl)-2-methylcyclopentane, respectively.

EXAMPLE 7

Six ml. of a 3 M solution of methylmagnesium bromide in ether is added slowly to 2.5 g. of 2-allyl-2-methylcyclopentane-1,3-dione in 25 ml. of dry ether. After addition is complete, the mixture is heated at reflux for one hour, cooled to 0° and then treated with saturated aqueous ammonium chloride until the reaction subsides. The organic layer is separated, combined with ether extracts of aqueous layer, and washed with water and brine. After drying over magnesium sulfate, solvent is evaporated to yield 3-hydroxy-3-methyl-2-allyl-2-methylcyclopentan-1-one which is purified by chromatography.

Following the process of Example 5, 1-(N-isohexylamino)-3-hydroxy-3-methyl-2-allyl - 2 - methylcyclopentane is prepared from the product of this example.

EXAMPLE 8

Following the procedure of Example 5, each of isopentylamine, methyl n-butylamine, methyl isopentylamine, methyl isobutyl amine and methyl isohexylamine is reacted with 3-hydroxy-2-(3'-methylbut-2'-enyl)-2-methylcyclopentan-1-one to prepare 3-hydroxy-2-(3'-methylbut-2'-enyl)-2-methyl-1-(N-isopentylamino) cyclopentane,
3-hydroxy-2-(3'-methylbut-2'-enyl)-2-methyl-1-(N,N-methyl n-butylamino) cyclopentane,
3-hydroxy-2-(3'-methylbut-2'-enyl)-2-methyl-1-(N,N-methyl isopentylamino) cyclopentane,
3-hydroxy-2-(3'-methylbut-2'-enyl)-2-methyl-1-(N,N-methyl isobutylamino) cyclopentane and
3-hydroxy-2-(3'-methylbut-2'-enyl)-2-methyl-1-(N,N-methyl isohexylamino) cyclopentane, respectively.

EXAMPLE 9

Following the procedure of Example 7, ethylmagnesium bromide is reacted with 2-(3'-methylbut-2'-enyl)-2-methylcyclopentane-1,3-dione to yield 3-hydroxy-3-ethyl-2-methyl-2-(3'-methylbut-2'-enyl) cyclopentan - 1 - one which is reacted with methyl isohexylamine using the procedure of Example 5 to prepare 3-hydroxy-3-ethyl-2-methyl-2-(3'-methylbut - 2' - enyl)-1-(N,N-methylisohexylamino) cyclopentane.

EXAMPLE 10

Following the procedure of Example 3, 1-vinyl-1-hydroxycyclohexane is reacted with 2-methylcyclopentane-1,3-dione to yield

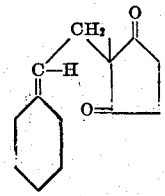

which is used as the starting material in the processes of Examples 2 and 7 or 9 to yield

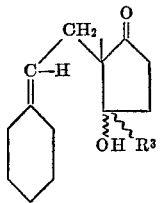

(V)

a compound of Formula V is reacted with an amine, e.g., methyl isohexylamine, using the procedure of Example 5 to yield

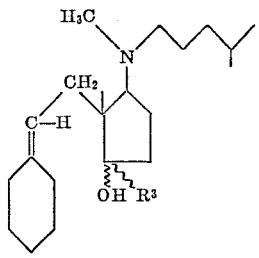

EXAMPLE 11

An excess of ammonia (about 10 ml.) is distilled into 30 ml. of anhydrous methanol, under nitrogen, and 283 mg. of sodium cyanoborohydride added. The mixture is adjusted to pH 5 by addition of dry halogen chloride and then 231 mg. of 3-hydroxy-2-allyl-2-methylcyclopentane-1-one is added. After about 48 hours, the mixture is poured into cold 5% sodium bicarbonate solution and then extracted with ether. The ethereal extract is washed, dried and evaporated under reduced pressure to yield 3-hydroxy-2-allyl-2-methyl-1-aminocyclopentane.

What is claimed is:
1. A compound selected from those of the following formula:

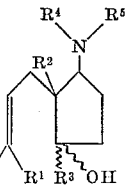

wherein, each of R, $R^1$, $R^3$, $R^4$ and $R^5$ is hydrogen or lower alkyl and $R^2$ is methyl or ethyl.

2. A compound according to claim 1 wherein each of R and $R^1$ is hydrogen, methyl or ethyl.

3. A compound according to claim 2 wherein $R^3$ is hydrogen, methyl or ethyl.

4. A compound according to claim 3 wherein $R^2$ is methyl.

5. A compound according to claim 4 wherein $R^4$ is hydrogen or methyl and $R^5$ is lower alkyl.

6. A compound according to claim 5 wherein $R^5$ is isohexyl.

7. A compound according to claim 5 wherein $R^4$ is methyl and $R^5$ is isohexyl.

8. A compound according to claim 1 wherein R and $R^1$ together form cyclopentyl or cyclohexyl.

9. A compound according to claim 8 wherein $R^2$ is methyl, $R^3$ is hydrogen, methyl or ethyl, $R^4$ is hydrogen or methyl, and $R^5$ is lower alkyl.

10. A compound according to claim 9 wherein R and $R^1$ together form cyclohexyl.

11. A compound according to claim 10 wherein $R^5$ is isohexyl.

References Cited

UNITED STATES PATENTS 2,390,597  12/1945  Law et al. _____ 260—565 R

LEWIS GOTTS, Primary Examiner

D. R. PHILLIPS, Assistant Examiner

U.S. Cl. X.R.

260—586 R; 424—325